(12) United States Patent
Furuki et al.

(10) Patent No.: US 6,354,945 B1
(45) Date of Patent: Mar. 12, 2002

(54) CONTROLLER

(75) Inventors: Shigeru Furuki, Fukushima-ken; Makito Takigawa, Miyagi-ken, both of (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/305,729

(22) Filed: May 5, 1999

(30) Foreign Application Priority Data

May 20, 1998 (JP) .......................................... 10-138246
Aug. 11, 1998 (JP) .......................................... 10-226780

(51) Int. Cl.⁷ .............................. A63F 9/24; G06F 19/00
(52) U.S. Cl. ...................... 463/38; 273/148 B; 345/161
(58) Field of Search ............................... 463/36–38, 46, 463/47; 273/148 B; 345/156, 161, 157

(56) References Cited

U.S. PATENT DOCUMENTS 5,542,672 A * 8/1996 Meredith ..................... 463/37
5,691,898 A * 11/1997 Rosenberg ................... 463/38
6,162,124 A * 12/2000 Hiraoka et al. .............. 463/38

FOREIGN PATENT DOCUMENTS

JP 1-316815 12/1989

OTHER PUBLICATIONS translation of JP 1–316815 by Diplomatic Language Service.*

* cited by examiner

Primary Examiner—Mark Sager
(74) Attorney, Agent, or Firm—Brinks Hofer Gilson & Lione

(57) ABSTRACT

In a controller, a control member includes a stick portion to be manipulated with the hand, and a spherical portion, which are integrally formed. The control member is provided with a coil spring for urging the spherical portion, and a magnetic attracting member for attracting the control member opposite from the urging direction. When the control member is urged by the urging means, the spherical portion is held by a friction member so as to increase the load on the control member. In contrast, when the control member is attracted by the magnetic attracting member, the spherical portion is separated from the friction member so as to decrease the load on the control member.

16 Claims, 11 Drawing Sheets

CONTROLLER

BACKGROUND OF THE INVENTION

1. Field of the Invention

The present invention relates to a controller for controlling an object displayed on a screen in a game or the like, and more particularly, to a controller for changing the motion transmitted to a control member according to the scene displayed on the screen.

2. Description of the Related Art

Figure 12:
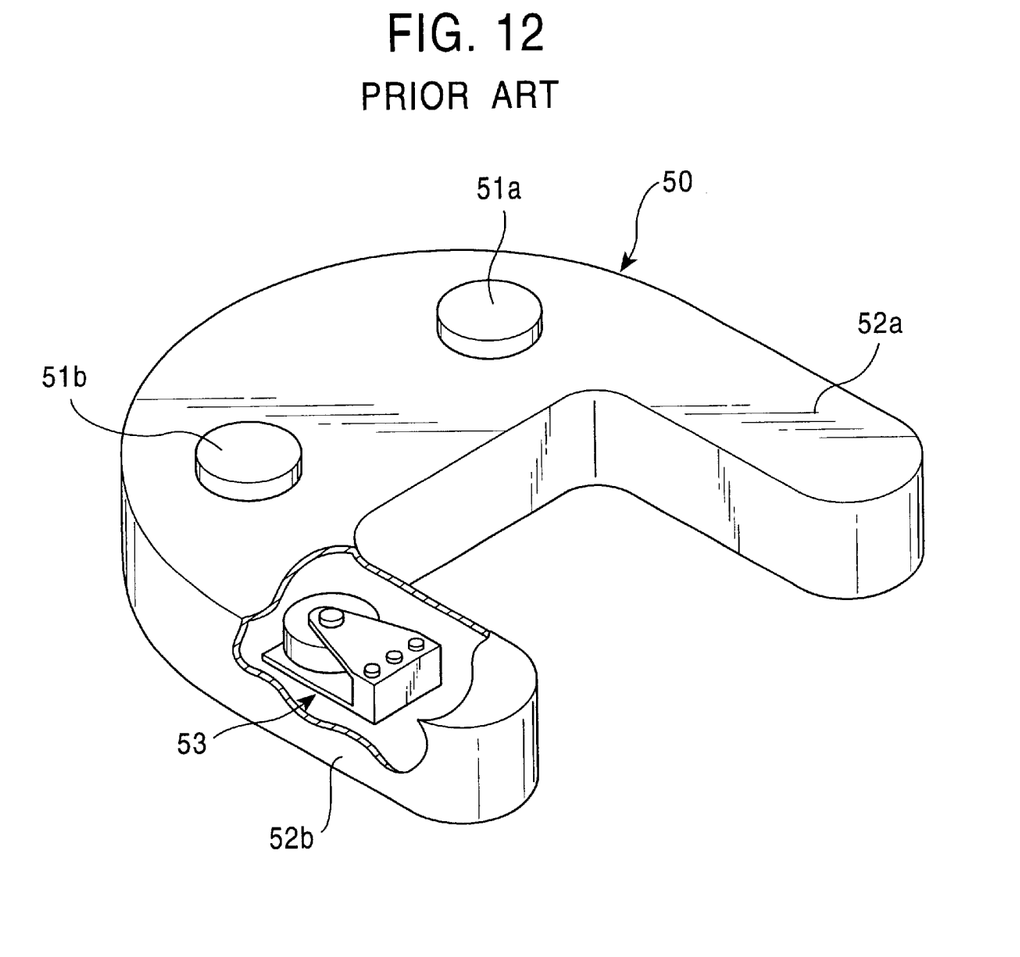
FIG. 12 is a perspective view of a conventional controller.

FIG. 12 is a perspective view of a conventional controller.

A controller 50 shown in FIG. 12 is to be gripped during operation, and has a housing that is nearly C-shaped. On one side of the housing, control members 51a and 51b are provided to freely control game-element images or the like displayed on a screen.

The controller 50 also includes grip portions 52a and 52b that can be gripped by the hands. Inside the grip portion 52b, a vibration generation device 53 is disposed to generate vibrations.

Figure 13:
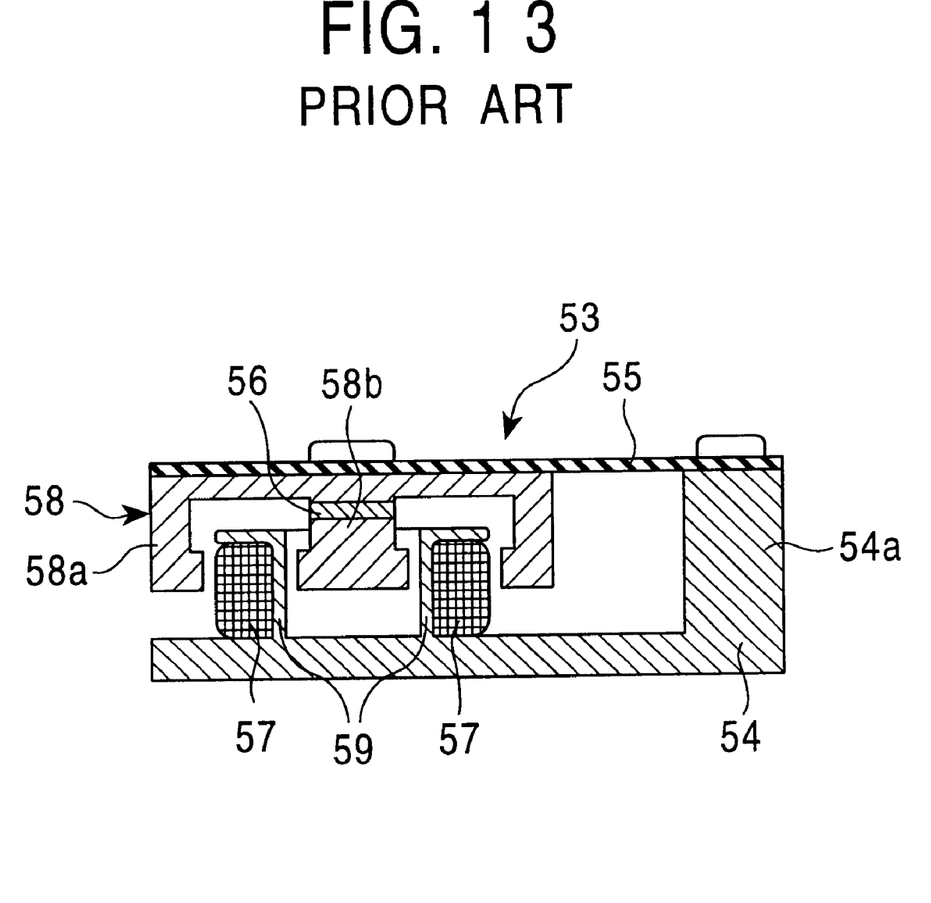
FIG. 13 is a sectional view showing the structure of a vibration generating device in the conventional controller.

FIG. 13 is a sectional view showing the structure of the vibration generation device 53.

The vibration generation device 53 comprises a support member 54 having an L-shaped cross section, an elastic member 55, a coil 57, and a yoke 58. On the upper surface of the support member 54, the coil 57 is wound around a bobbin 59. The elastic member 55 is disposed on the top of a standing portion 54a of the support member 54 so as to extend toward the coil 57. On the surface of the elastic member 55 that faces the coil 57, the yoke 58 is mounted. The yoke 58 includes a cover portion 58a for covering the coil 57, and a projecting portion 58b having a magnet 56 held in the center thereof.

In the above-described vibration generation device 53, the yoke 58 is vertically moved with the elastic member 55 by passing current through the coil 57 and cyclically switching energization and de-energization of the coil 57, so that vibrations are given to the vibration generation device 53.

When the controller 50, in which the vibration generation device 53 is thus incorporated in the grip portions 52a and 52b, is used for a game or the like, the vibration generation device 53 is vibrated according to the scene in the game, and the vibration is transmitted to the hands of the operator, which allows the operator to have a realistic feeling during play.

Another known type of vibration generation device uses a motor (not shown) having an eccentric weight (e.g., a weight having a semicircular cross section) mounted on the shaft thereof. In this case, vibration can be generated by rotating the shaft of the motor to produce eccentric motion In the above-described conventional controllers, however, it is possible to vibrate only the housing of the controller, whereas it is impossible to variously alter the force applied to the controller. It is at most possible to change the amplitude of vibration generated by the vibration generation device. While the vibration can be given to the grip portions 52a and 52b, it cannot be given to the control members 51a and 51b. Therefore, for example, when such a controller is used for a game, it is impossible to give a variety of changes to the controller according to various situations in the game, which hinders the realism of the game.

SUMMARY OF THE INVENTION

The present invention has been made in order to solve the above-described conventional problems, and it is accordingly an object of the present invention to provide a controller in which the operation of a control member is variously changed so as to make a game or the like more realistic.

According to an aspect of the present invention, there is provided a controller having a control member to be manipulated with the hand, and a detecting section for detecting the motion of the control member, the controller including a load variable means for changing the operating load on the control member.

For example, when the controller is used for a game, the load variable means can impose the load on the control member according to the scene displayed on a screen. That is, the operation of the control member is made difficult by increasing the load, and is made easy by decreasing the load.

For example, in a case in which the above controller is used as a control stick of an airplane in a game, when steering is performed to impose the load on the control stick in a manner similar to the steering in an actual airplane, it is possible to similarly impose the load on the control member of the controller. Furthermore, it is possible to impose a heavy load on the control member of the controller in moving a heavy object displayed on the screen, or to give an impact similar to an apparent impact given to a game-element image that is being controlled, for example, an impact (load) for pushing back the control member in the opposite direction from the operating direction thereof.

Not only the above load, but also vibrations may be given to the control member. In this way, load and vibrations can be directly given to the control member itself to be manipulated with the hands. Accordingly, a variety of operation changes can be made to the control member by giving operating load, vibrations, or a combination of both, to the control member. The use of such a controller for a game makes it possible to physically feel the game, and to thereby further add to the realism.

Further objects, features, and advantages of the present invention will become apparent from the following description of the preferred embodiments with reference to the attached drawings

DESCRIPTION OF THE PREFERRED EMBODIMENTS

A controller according to a first embodiment of the present invention will be described below with reference to FIGS. 1 to 7.

Figure 1:
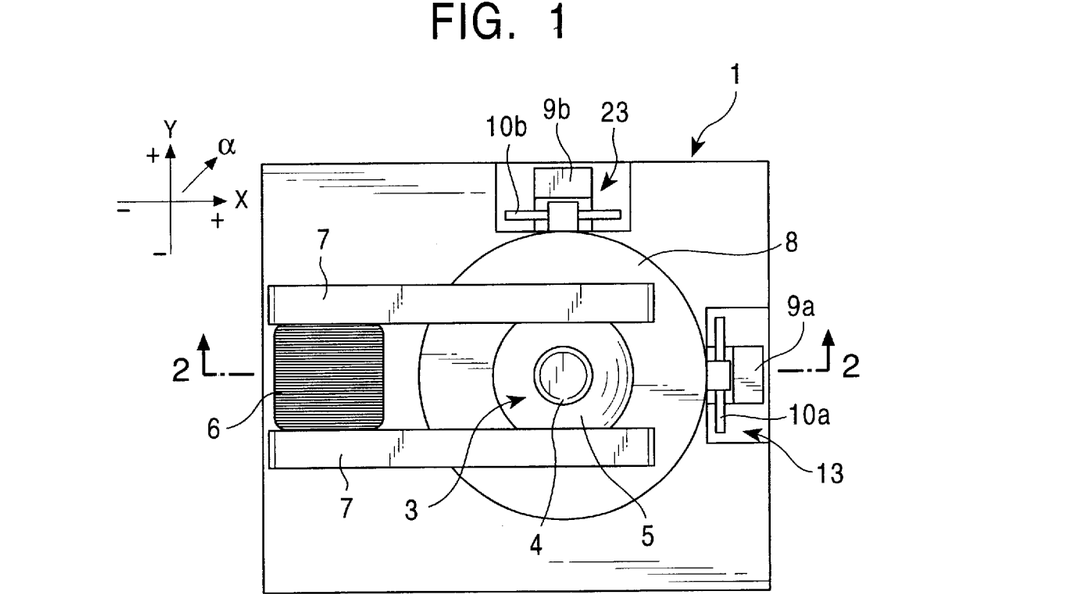
FIG. 1 is a plan view of a controller according to a first embodiment of the present invention.
Figure 2:
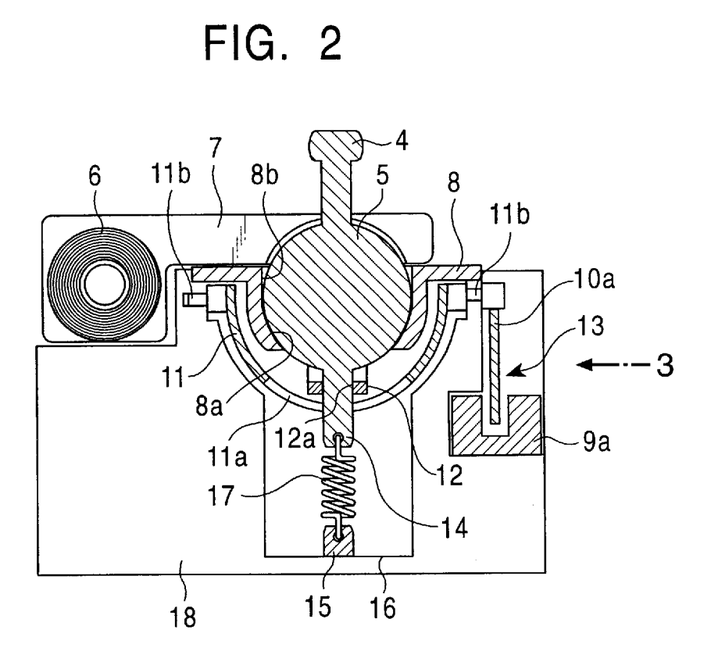
FIG. 2 is a sectional view taken along line 2—2 of FIG. 1.
Figure 3:
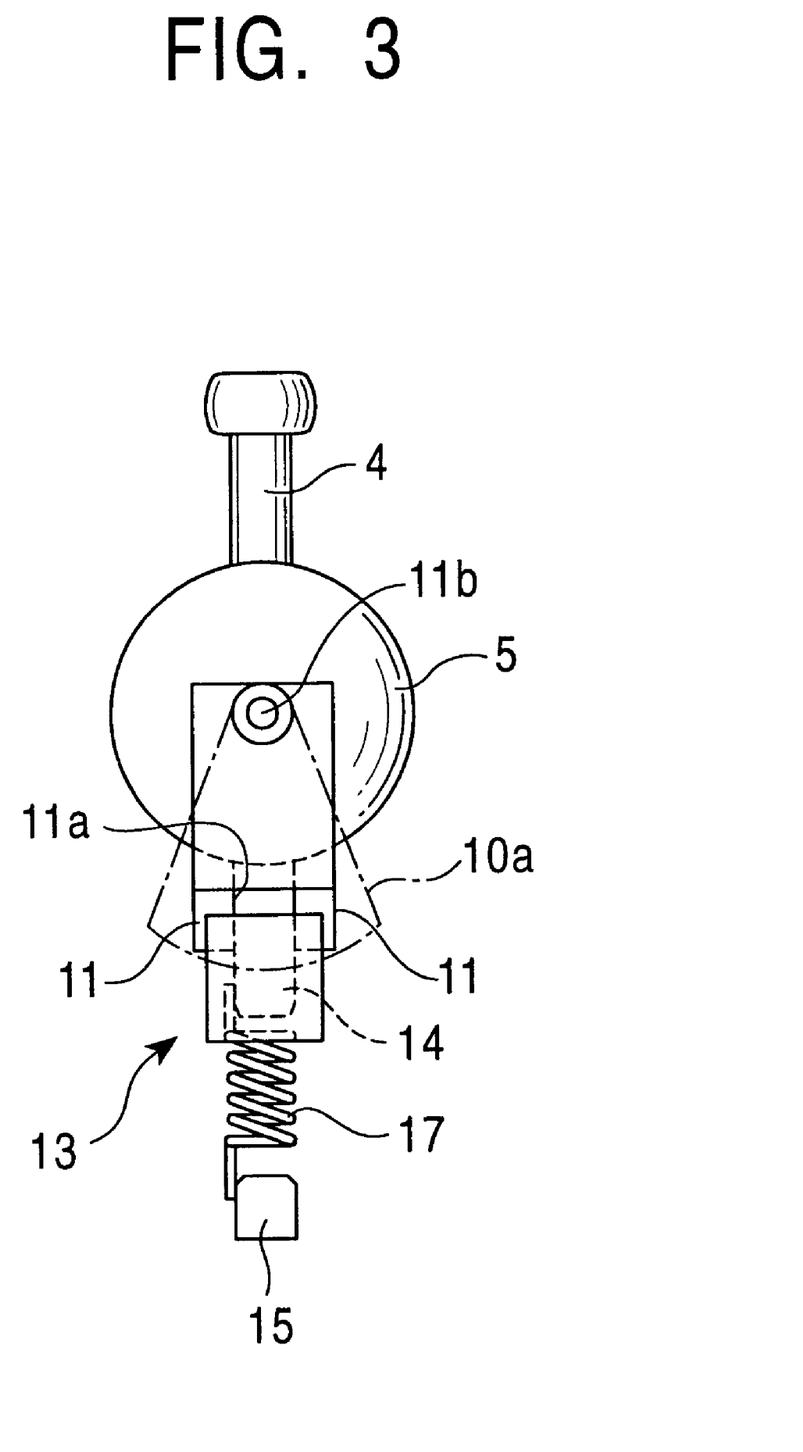
FIG. 3 is a partial side view, as viewed from the direction of the arrow 3 of FIG. 2.
Figure 4:
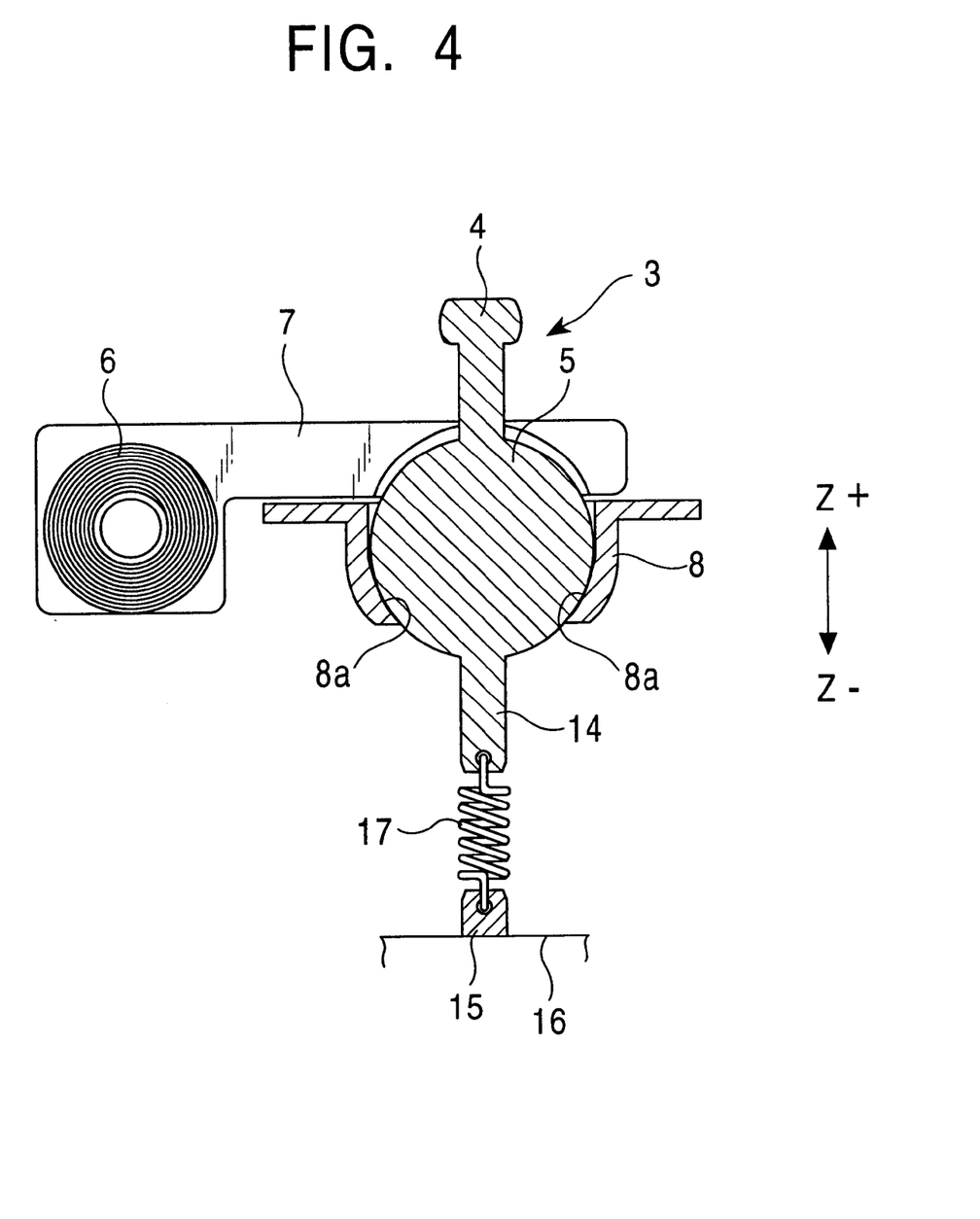
FIG. 4 is a partial side view showing a state in which the controller of the first embodiment is not alive.
Figure 5:
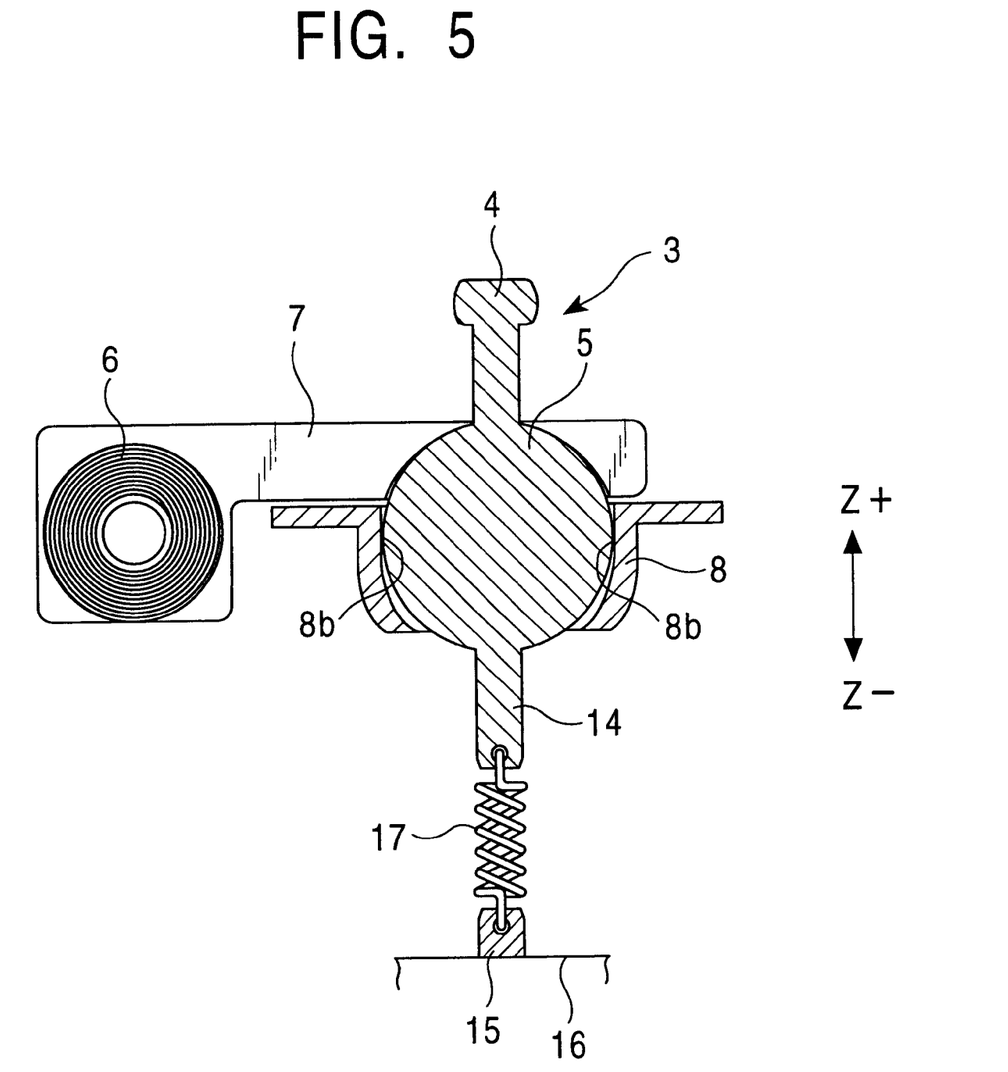
FIG. 5 is a partial side view showing a state in which the controller of the first embodiment is alive.
Figure 6:
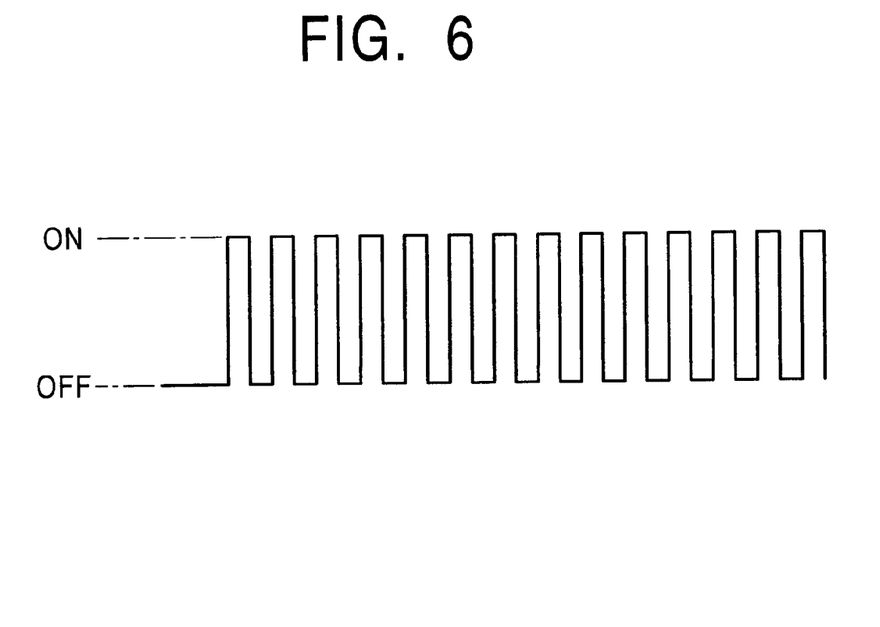
FIG. 6 is a waveform chart showing a current-carrying pattern for putting the load on a control member in the controller of the first embodiment.
Figure 7:
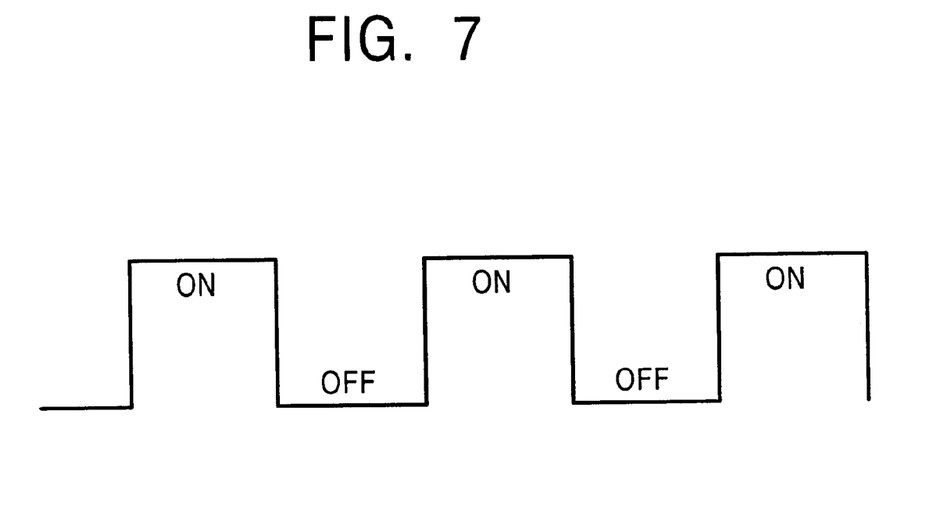
FIG. 7 is a waveform chart showing a current-carrying pattern for applying vibrations to the control member in the controller of the first embodiment.

FIG. 1 is a plan view of a controller of the first embodiment, FIG. 2 is a sectional view taken along line 2—2 of FIG. 1, FIG. 3 is a partial side view, as viewed from the direction of the arrow 3 of FIG. 2, FIGS. 4 and 5 are explanatory views showing the operation of a control member, and FIGS. 6 and 7 are waveform charts showing current-carrying patterns.

Referring to FIGS. 1 and 2 a controller 1 includes a control member 3 to be manipulated with the hand, and further includes a magnetic attracting means for attracting the control member 3, an urging means for urging the control member 3, and a detecting means for detecting the movement of the control member 3.

The control member 3 comprises a stick portion 4 with which the hand makes contact, a spherical portion 5, and a foot portion 14, which are integrally formed and are placed inside a recess 16 of a housing 18.

Around the spherical portion 5, a cylindrical friction member 8 is provided to hold the spherical portion 5. The top end of the friction member 8 projects outward in the radial direction, and is attached to the edge of the recess 16. The friction member 8 is made of a material that has a high coefficient of friction with respect to the spherical portion 5.

The friction member 8 is formed so that the diameter thereof decreases toward the lower part of the cylinder. A lower side face 8a of the friction member 8 is formed by a curved surface that allows the spherical portion 5 to be fitted therein, that is, a curved surface similar to that of the spherical portion 5, and the spherical portion 5 is held therein without any clearance. An upper side face 8B of the friction member 8 has a cylindrical shape, and allows the spherical portion 5 to vertically move therein. The spherical portion 5 is made of a magnetic substance, for example, iron. The stick portion 4, the spherical portion 5, and the foot portion 14 may be integrally made of a synthetic resin material, and a magnetic material may be inserted in the inside of the spherical portion 5. Alternatively, a thin magnetic metal plate may be fitted on the top face of the spherical portion 5.

The foot portion 14 is connected to a coil spring 17 attached to a support piece 15 that projects from the bottom of the recess 16. The control member 3 is thereby always urged downward, and the urging force acts in a direction to press the spherical portion 5 against the lower side face 8a of the friction member 8.

The controller 1 of this embodiment further includes a magnetic attracting means for attracting the spherical portion 5.

That is, an electromagnet coil 6 is placed on the top face of the housing 18. Two yokes 7 project from the electromagnet coil 6 toward the spherical portion 5 so as to cover a part of the top face of the spherical portion 5, and so as to place the stick portion 4 therebetween. The lower surfaces of the yokes 7 are cut out in a curved form so as to cover and fit on a part of the top face of the spherical portion 5. In this case, a small space is formed between the exposed surface of the spherical portion 5 exposed from the housing 18 and the lower surfaces of the yokes 7 in the state in which the spherical portion 5 is placed in the lower side face 8a of the friction member 8.

The controller 1 of this embodiment further includes detecting sections (detecting means) 13 and 23 for detecting the motion of the control member 3.

As shown in FIGS. 2 and 3, a bow-shaped bridge 11 extends under the spherical portion, and is turnably supported by shafts 11b on both sides of the spherical portion 5 so that it can turn relative to the housing 18. In this case, the bridge 11 rotates about the Y-axis of FIG. 1. On the side of the detecting section 23, a bridge 12 also extends orthogonal to the bridge 11 (in the Y-axis direction of FIG. 1), and is supported to rotate about the X-axis.

The bridges 11 and 12 have belt-like through holes 11a and 12a, respectively, along the longitudinal direction thereof, through which the foot portion 14 is passed. The through holes 11a and 12a have such a size as to allow the foot portion 14 to move therein when the control member 3 is operated.

According to the above configuration, when the control member 3 is turned in the X-axis direction, the foot portion 14 moves in the through hole 11a of the bridge 11, and turns the bridge 12 in the X-direction. In contrast, when the control member 3 is turned in the Y-axis direction, the foot portion 14 moves in the through hole 12a of the bridge 12, and turns the bridge 11 in the Y-axis direction.

The detecting section 13 is mounted on the side of the bridge 11 via one of the shafts 11b. As shown in FIG. 3 (a partial side view, as viewed from the direction of the arrow 3 of FIG. 2), a fan-shaped slit plate 10a having a plurality of slits (not shown) in the circumferential portion thereof is attached to the shaft 11b. At the leading end of the slit plate 10a, a photosensor 9a is placed to periodically emit light from one side of the slit plate 10a toward the slit plate 10a, and to detect the light by a light receiving portion disposed on the other side of the slit plate 10a, thereby detecting the movement of the control member 3 in the Y-axis direction. On the side of the bridge 12, the detecting section 23 including a slit plate 10b and a photosensor 9b is also provided to detect the movement of the control member 3 in the X-axis direction, in a manner similar to the above.

That is, when the control member 3 is moved forward and backward (in the Y-axis direction), the foot portion 14 moves the bridge 11. In this case, by moving the stick portion 4 in the forward direction (in the −Y-axis direction), the bridge 11 is turned in the opposite direction (the +Y-axis direction). By moving the stick portion 4 in the +Y-axis direction, the bridge 11 is turned in the −Y-axis direction. Regarding the rightward and leftward movement (in the X-axis direction) of the control member 3, the bridge 12 is turned in the −X-axis direction by moving the stick portion 4 in the +X-axis direction, and is turned in the +X-axis direction by moving the stick portion 4 in the −X-axis direction.

When the stick portion 4 is moved in the α-direction, i.e., inclined to both the X-axis and the Y-axis, the bridge 11 and the bridge 12 are both turned, which makes it possible to obtain detection signals from both the detecting sections 13 and 23, and to transmit information for moving gameelement images and the like displayed on the screen in the α-direction.

Next, a description will be given of the operating load and vibrations to be applied to the controller 1 of this embodiment.

FIG. 4 shows a state in which the urging means is acting on the control member 3, and FIG. 5 shows a state in which the magnetic attracting means is acting on the control member 3.

In the magnetic attracting means, magnetic force can be generated in the yokes 7 by passing electric current through the electromagnet coil 6.

As shown in FIG. 4, when the electromagnet coil 6 is de-energized, an attracting force for attracting the spherical portion 5 to the yokes 7 is not generated, so that the spherical portion 5 is pressed against the lower side face 8a of the friction member 8 by the urging force of the coil spring 17 in the −Z direction. This increases the load that acts on the control member 3, and makes it difficult to manipulate the control member 3 with a finger or the like.

When the electromagnet coil 6 is energized, as shown in FIG. 5, an attracting force for attracting the spherical portion 5 to the yokes 7 is generated, so that the spherical portion 5 is separated from the lower side face 8a of the friction member 8 against the urging force of the coil spring 17. In this case, the spherical portion 5 is raised to the upper side face 8b of the friction member 8 in the form of a straight line. This decreases friction force generated between the spherical portion 5 and the upper side face 8b, and reduces the operating load on the control member 3. Accordingly, the control member 3 can be easily moved with the finger or the like.

In the above case, a continuous current is passed through the electromagnet coil 6 by a current-carrying pattern shown in FIG. 6, that is, by switching between energization and de-energization at a high frequency, and the attracting force of the yokes 7 for attracting the spherical portion 5 is thereby made constant. As a result, the state shown in FIG. 5 is brought about, in which the load on the operation of the control member 3 is reduced. That is, the attracting force for attracting the spherical portion 5 to the yokes 7 can be controlled by changing the frequency of the current to be applied to the electromagnet coil 6, and the load in operating the control member 3 is also thereby changed. In this case, a current-carrying pattern for rapidly passing a large current through the electromagnet coil 6 may be formed so as to cause the spherical portion 5 to collide with the yokes 7, and to thereby give an impact to the control member 3.

Furthermore, the control member 3 can be vibrated by a current-carrying pattern shown in FIG. 7, that is, by switching between energization and de-energization, at a lower frequency than in the pattern for applying the load.

In this case, when the electromagnet coil 6 is energized, the attracting force for attracting the spherical portion 5 acts to raise the control member 3. When the electromagnet coil 6 is de-energized, the attracting force does not act on the spherical portion 5. In contrast, the urging force of the coil spring 17 acts to lower the control member 3. The repetitions of such raising and lowering operations vertically vibrate the control member 3.

In this case, the speed of the vertical vibration is decreased by decreasing the frequency of the current-carrying pattern, and is increased by increasing the frequency. As described above, the vibration pattern can also be changed.

The controller 1 having the above configuration is incorporated in a controller body for use. In this case, the shape of the controller body can be appropriately determined. The control member may be shaped like a small stick to be operated with the fingers, or like a large stick to be held in the entire hand, such as a control stick.

More changes may be effected in the control member by separately controlling the attracting forces of the yokes 7.

Next, a controller according to a second embodiment of the present invention will be described with reference to the drawings.

Figure 8:
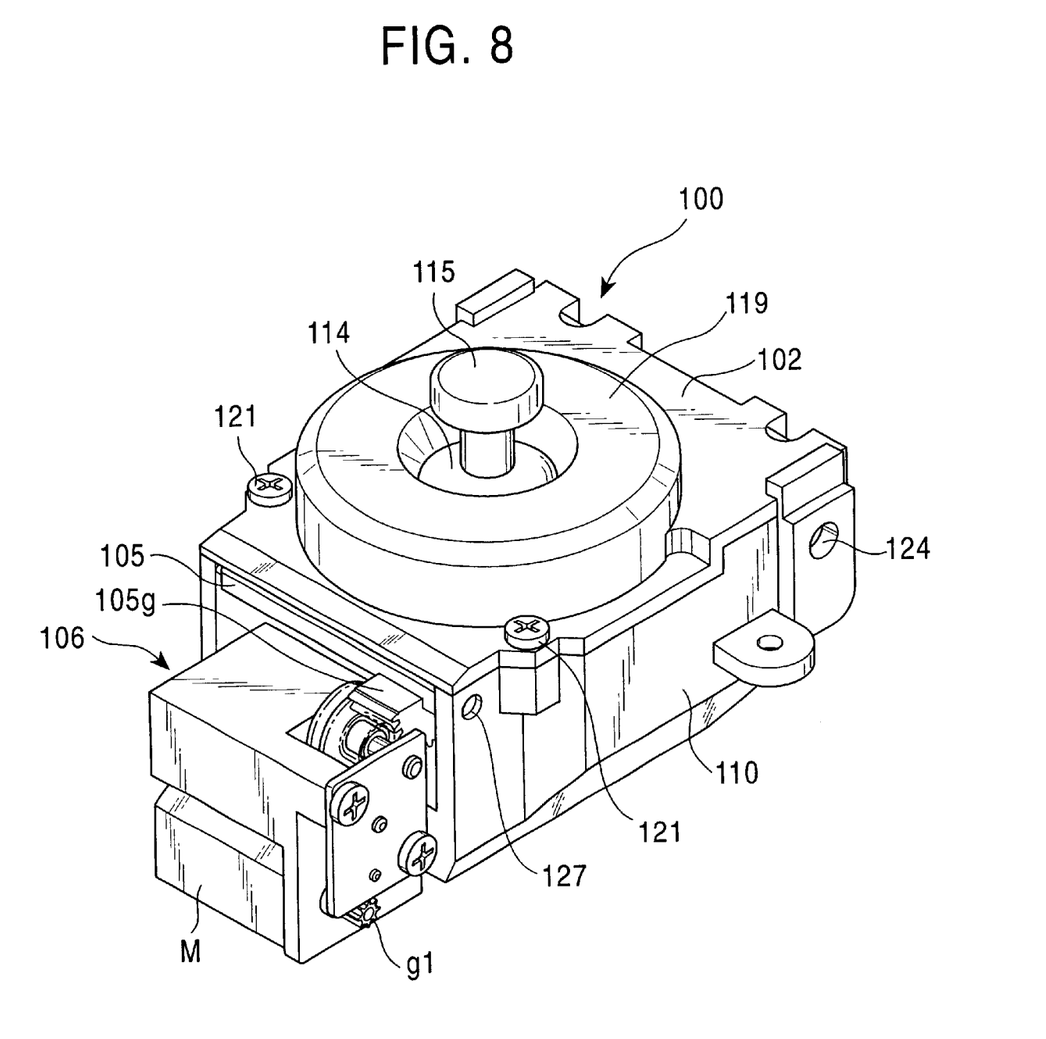
FIG. 8 is a perspective view showing the outward appearance of a controller according to a second embodiment of the present invention.
Figure 9:
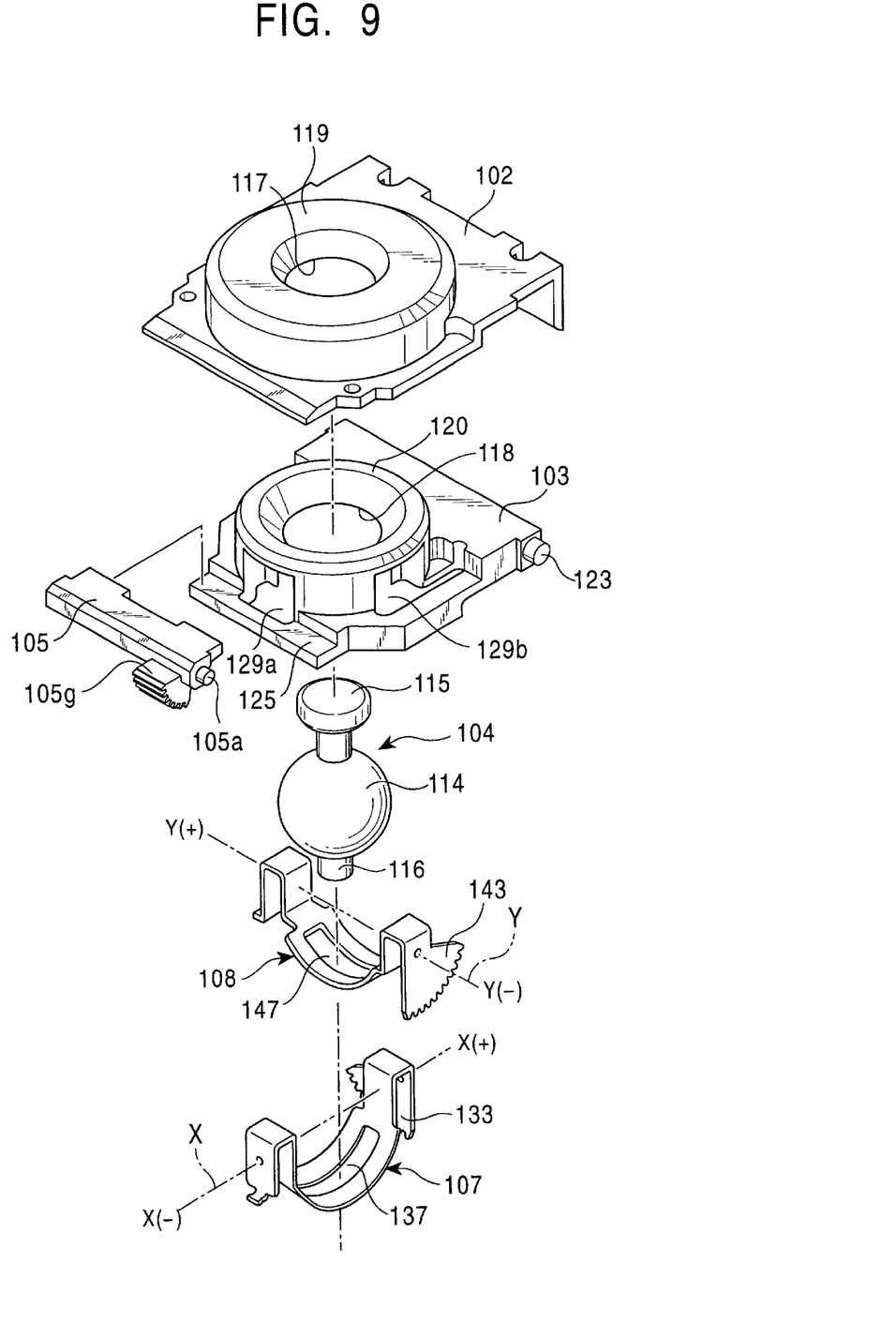
FIG. 9 is an exploded perspective view showing the internal configuration of the controller of the second embodiment.
Figure 10:
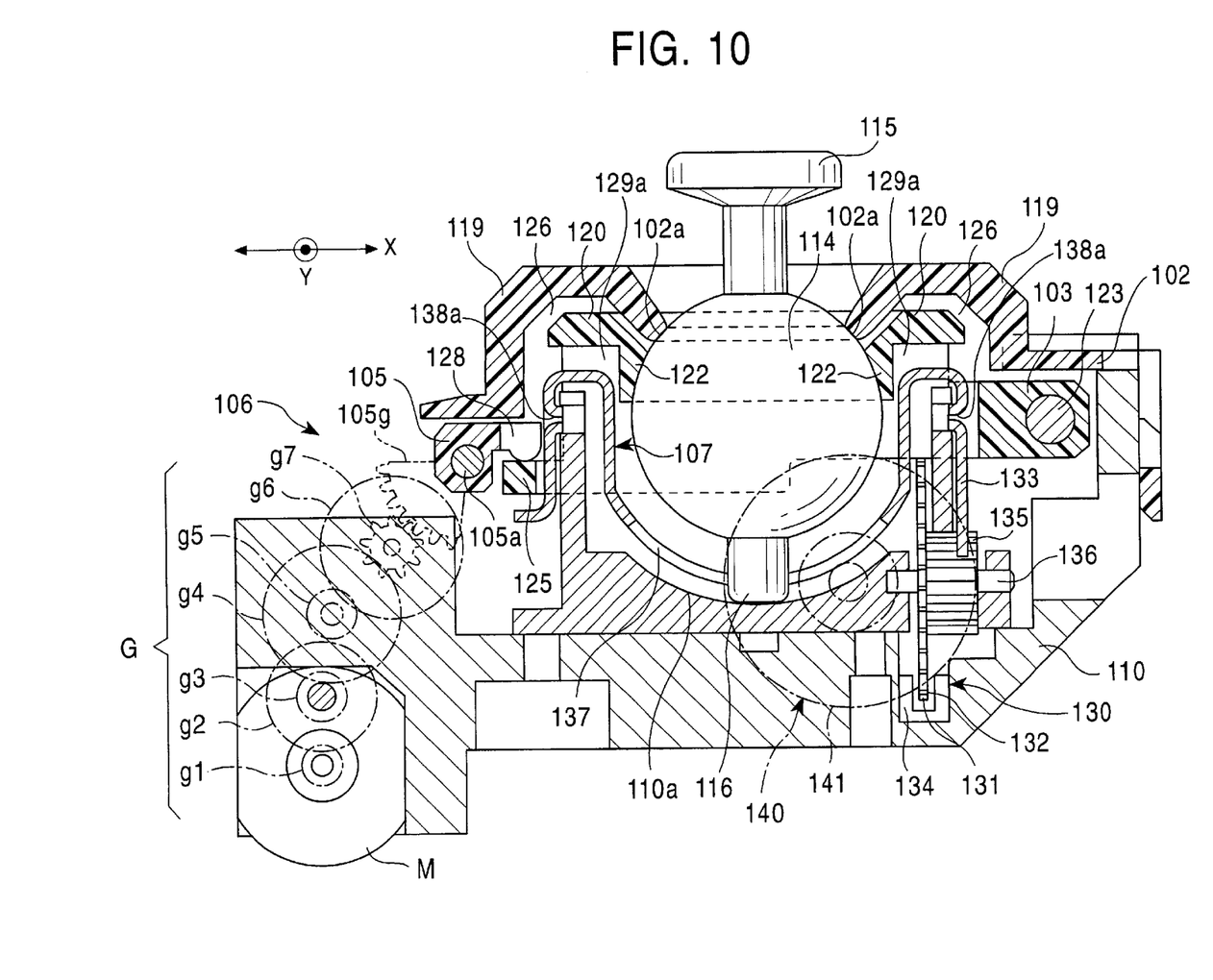
FIG. 10 is a sectional view of the controller of the second embodiment.

FIG. 8 is a perspective view showing the outward appearance of the controller of the second embodiment, FIG. 9 is an exploded perspective view showing the internal configuration of the controller shown in FIG. 8, and FIG. 10 is a sectional view showing the internal configuration of the controller shown in FIG. 8.

In a controller 100 shown in FIGS. 8 to 10, a brake member 103 is mounted on the top of a housing 110, and a cover 102 is further mounted to cover the brake member 103. In the inside covered with the housing 110, the cover 102, and the brake member 103, there is provided a control member 104 to be manipulated with the hand.

The control member 104 includes a spherical portion 114, a stick 115 at the top end of the spherical portion 114 to be manipulated with the hand, and a shaft portion 116 at the bottom end of the spherical portion 114 (on the side opposite from the top end), which are integrally formed, and are made of the same material. In this case, the shaft portion 116 of the control member 104 slides on a curved face 110a of the housing 110, and the spherical portion 114 of the control member 104 slides relative to a part of the cover 102 and is supported thereby, whereby the control member 104 can be moved in a three-dimensional manner.

The cover 102 is made of a resin material, and has, at its center, a through hole 117 having such a size that the stick 115 of the control member 114 can be passed therethrough. As shown in FIG. 10, an edge portion 102a of the cover 102 is in contact with the spherical portion 114 to support the control member 104. Preferably, the edge portion 102a is made of a material that has a low frictional resistance with respect to the spherical portion 114. In this case, only the edge portion 102a or the entire cover 102 may be made of such a material having a low frictional resistance with respect to the spherical portion 114.

The cover 102 also includes a projecting portion 119 that projects upward from the rim of the through hole 117, and a recess 126 formed on the back side of the projecting portion 119. The inner peripheral surface of the through hole 117 is tapered upward from the rim portion 102a so that the control member 104 can be substantially tilted during operation.

The cover 102 is mounted to cover the top of the housing 110, and is fixed to the housing 110 by screws 121. In this case, the cover 102 may be appropriately fixed by fixing methods other than screwing, for example, it may be fixed with an adhesive.

Referring to FIG. 9, the brake member 103 is made of a resin material, and has a circular through hole 118 at the center thereof. A projecting portion 120 is formed to project upward from the rim of the through hole so that the upper part thereof is fitted in the recess 126 on the back side of the cover 102 (see FIG. 10). The through hole 118 is a circular hole having a smaller diameter than that of the equatorial plane of the spherical portion 114, and a brake portion 122 extends from the through hole 118 to the vicinity of the equator. The brake portion 122 is shaped like a curved surface having nearly the same curvature as that of the surface of the spherical portion 114. In the state in which load is not imposed on the control member 104, the brake portion 122 is in slight contact with the surface of the spherical portion 114.

The brake member 103 has, at one end, a rotation shaft 123 that projects sideways to be passed through a shaft hole 124 formed in the side face of the housing 110 (this also applies to the opposite side of the paper). The brake member 103 can be turned up and down on the rotation shaft 123. At the other end of the brake member 103, a pressed portion 125 is formed integrally therewith, and a pressing member 105, which will be described later, abuts on the pressed portion 125.

At the leading end of the pressing member 105, a pressing portion 128 for pressing the pressed portion 125 is formed so that the lower surface thereof is in contact with the upper surface of the pressed portion 125. At the base end of the pressing member 105, a rotation shaft 105a projects sideways to be passed through shaft holes 127 formed in the side faces of the housing 110. The pressing portion 128 can be turned up and down on the rotation shaft 105a. Furthermore, a gear 105g is formed at one end on the opposite side from the pressing portion 128 so as to be meshed with a train of reduction gears G in a drive section 106.

The drive section 106 comprises a motor M and the train of reduction gears G. In the train of reduction gears G, major-diameter gears g2, g4, and g6, and minor-diameter gears g3, g5, and g7 are integrally formed, respectively. A driving force from a gear g1 mounted on the main shaft of the motor M is reduced by the train of reduction gears G, and is transmitted to the minor-diameter gear g7. Since the minor-gear g7 and the gear 105g of the pressing member 105 are meshed with each other, the turning power is transmitted to the pressing member 105. The reduction gear ratio of the train of reduction gears G may be appropriately changed according to the usage.

In the controller 100 of this embodiment, it is preferable as a combination that the brake portion 122 be made of ABS resin, and that the spherical portion 114 be made of an aluminum material. In this case, the spherical portion 114 may have a cavity therein. Furthermore, the surface of the resin spherical portion 114 may be coated with a hard film. The combination of materials of the brake portion 122 and the spherical portion 114 is not limited to that above, and the brake portion 122 and the spherical portion 114 may be made of other appropriate materials as long as they can brake the motion of the control member 104.

The controller 100 of this embodiment also includes detecting sections (detecting means) 130 and 140 for detecting the motion of the control member 104.

As shown in FIGS. 9 and 10, a bow-shaped bridge 107 extends under the spherical portion 114 in the X-axis direction of FIG. 9, and is supported by shafts 138a on both sides of the spherical portion 114 so as to turn on the X-axis relative to the housing 110. The brake member 103 has a pair of holes 129a in which the bridge 107 is fitted, and the shafts 138a are exposed from the holes 129a.

On the side of the detecting section 140, a bridge 108 is placed orthogonal to the bridge 107 to extend in the Y-axis direction of FIG. 9, and is supported to turn on the Y-axis. In a manner similar to the above, the brake member 103 has a pair of holes 129b in which the bridge 108 is fitted. Inside the holes 129b, the bridge 108 is turnably supported.

The bridges 107 and 108 have belt-like through holes 137 and 147, respectively, at the center in the longitudinal direction. The through holes 137 and 147 allow the shaft portion 116 to be passed therethrough, and have such a size that the shaft portion 116 can move therein when the control member 104 is operated.

When the control member 104 is turned in the X-axis direction, the shaft portion 116 moves in the through hole 137 of the bridge 107, and turns the bridge 108 on the Y-axis. In contrast, when the control member 104 is turned in the Y-axis direction, the shaft portion 116 moves in the through hole 147 of the bridge 108, and turns the bridge 107 on the X-axis.

On the side of one of the shafts 138a, a fan-shaped gear 133 is formed integrally with the bridge 107. The detecting section 130 is provided to detect the turn of the fan-shaped gear 133 on the shaft 138a.

In the detecting section 130, a circular slit plate 131 is disposed, as shown in FIG. 10. The circular slit plate 131 has, on its periphery, a plurality of slits 132 that are cut out at regular intervals, and is turnably supported with a shaft 136 at the center thereof mounted in the housing 110 A gear 135, which is formed integrally with the slit plate 131 to share the shaft 136, is meshed with the fan-shaped gear 133. Therefore, when the control member 104 is operated and the bridge 107 turns on the X-axis, the slit plate 131 is rotated.

At a part of the periphery of the slit plate 131, a photosensor 134 is disposed to continuously emit light from one side of the slit plate 131 toward the slits 132, and to detect the light by a receiving portion on the other side of the slit plate 131, thereby detecting the movement of the control member 104 in the Y-axis direction. Similarly, the detecting section 140 including a slit plate 141 and a photosensor (not shown) is also provided for the bridge 108, and the photosensor detects the movement of the control member 104 in the X-axis direction, that is, the turn of the bridge 108 on the Y-axis.

That is, when the control member 104 is moved in the Y-axis direction, the shaft portion 116 turns the bridge 107 on the X-axis. By moving the stick 115 forward (in the −Y-axis direction), the bridge 107 is turned in the opposite direction (in the +Y-axis direction) from the above direction. In contrast, by moving the stick 115 in the +Y-axis direction, the bridge 107 is turned in the −Y-axis direction. Regarding the movement of the control member 104 in the X-axis direction, the bridge 108 is turned in the −X-axis direction by moving the stick 115 in the +X-axis direction, and is turned in the +X-axis direction by moving the stick 115 in the −X-axis direction.

When the stick 115 is operated in a direction that is inclined with respect to both the X-axis and Y-axis, the bridges 107 and 108 are both turned, whereby detection signals are obtained from both the detecting sections 130 and 140.

Next, a description will be given of the operating load in the controller 100 of this embodiment.

In the state in which operating load is not imposed on the control member 104, the brake portion 122 of the brake member 103 is slightly spaced from the surface of the spherical portion 114, or is in light contact with the spherical portion 114. In this case, the friction force for imposing operating load is not generated between the brake portion 122 and the spherical portion 114. Accordingly, the operator can operate the control member 104 without feeling any load.

In order to put operating load on the control member 104, the motor M is driven to move the pressing member 105 via the train of reduction gears G. The driving force turns the pressing portion 128 of the pressing member 105 downward At this time, the pressing portion 128 presses the pressed portion 125, and the brake member 103 turns on the rotation shaft 123 downward (in the counterclockwise direction). The spherical portion 114 is thereby pressed by the brake portion 122, and the friction force is generated on the sliding face between the brake portion 122 and the spherical portion 114, thereby imposing the operating load. Therefore, the operator needs a great operating force to operate the control member 104.

When the motor M is de-energized to be stopped in this state, a backlash is generated, and the friction force on the sliding surface between the brake portion 122 and the spherical portion 114 decreases, whereby the load imposed on the control member 104 is reduced or removed. In the present invention, the load on the spherical portion 114 is reduced only by de-energizing the motor M after putting the load on the spherical portion 114 by the brake portion 122. When the motor M is energized again in the state in which the load is reduced, the pressing portion 128 presses the pressed portion 125 again, thereby increasing the load on the spherical portion 114. Such intermittent energization of the motor M makes it possible to increase or decrease the operating load.

In order to prevent the backlash, by continuing to pass a smaller current than in the energized state, or by passing the current in a pulse form at a constant duty ratio, after de-energizing the motor M, the operating load can be maintained equivalent to that in the above state (initial state). Under such control, the pressing portion 128 continues to press the pressed portion 125, and the operating load is continuously given to the spherical portion 114.

In order to recover a state in which no load is imposed on the spherical portion 114, after the above-described reduction in load using the backlash, or continuous load application, the motor M is rotated in reverse to turn the pressing member 105 counterclockwise. By doing this, the pressing portion 128 of the pressing member 105 turns upward (counterclockwise), and the friction force between the brake portion 122 and the spherical portion 114 is removed. Therefore, the operator can operate the control member 104 without feeling any load.

The amount of load on the control member 104 can be controlled by changing the drive amount of the motor M.

For example, in the case in which the above-described controller 100 is used as a game controller, a game can be made more realistic by increasing the load to be placed on the control member when an object to be controlled dives into water or into deep snow, when a car accelerates, or when the physical strength of a person to be controlled declines.

Figure 11:
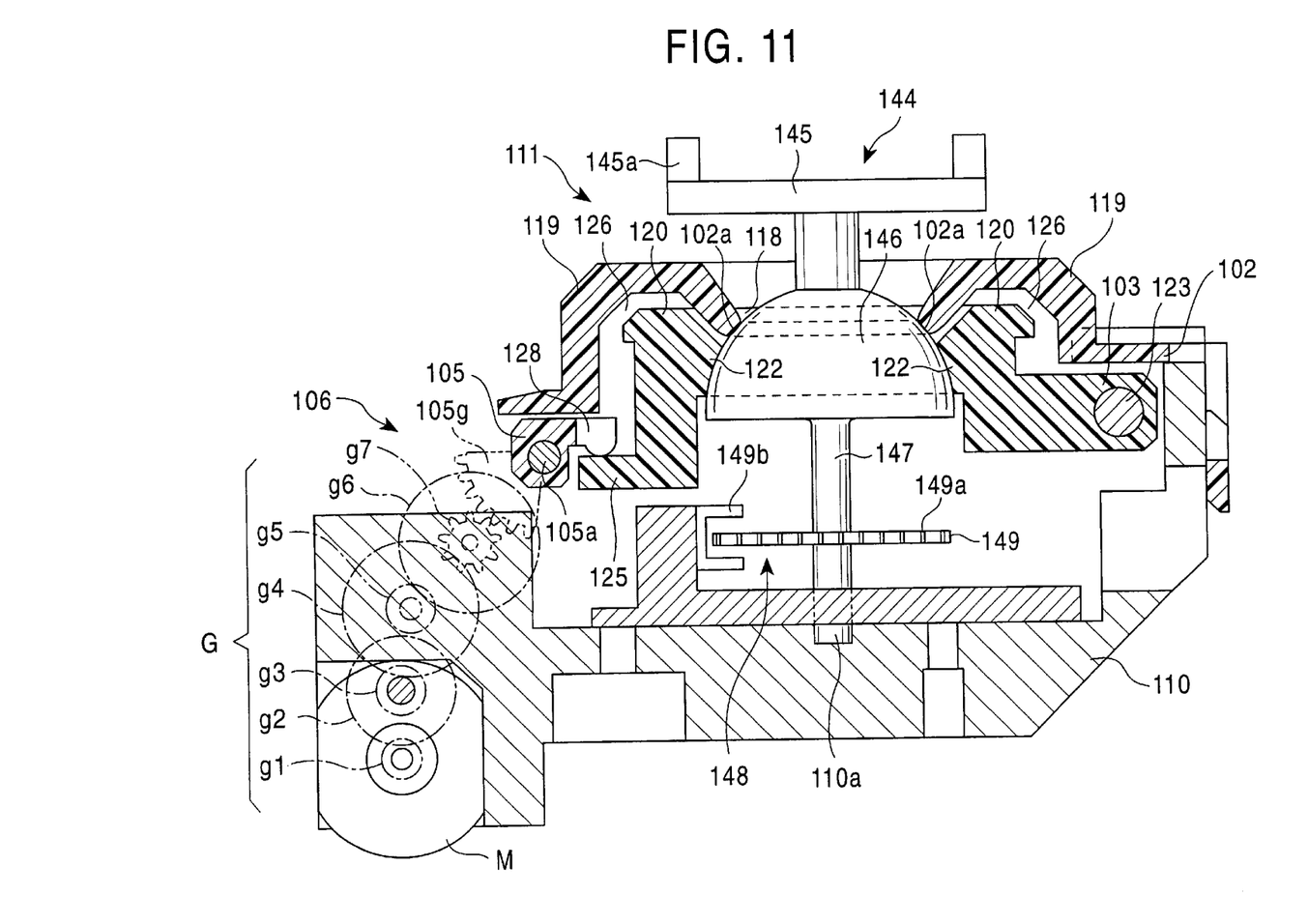
FIG. 11 is a sectional view of a controller according to a third embodiment of the present invention.

FIG. 11 shows a controller according to a third embodiment of the present invention.

A controller 111 shown in FIG. 11 is applicable to, for example, a reel for a fishing game. While the configuration of the controller 111 is based on that shown in FIG. 10, the control member 104 is replaced with a control member 144 shaped like a reel, and the detecting sections 130 and 140 are replaced with a detecting section 148 provided for the reel. Other components, such as a cover 102, a drive section 106, and a pressing member 105, may be formed similar to those in the above-described controller 100. A brake member 103 may also be formed in nearly the same shape as that in the controller 100.

The control member 144 comprises a semicircular portion 146, a shaft portion 147 at the semicircular portion 146, and a handle 145 on the opposite side from the shaft portion 147. The handle 145 includes a grip portion 145a to be gripped so as to turn the control member 144. The control member 144 is rotatably supported so that a part of the semicircular portion 146 is supported by an edge portion 102a of a through hole 118 formed in the cover 102, and so that the shaft portion 147 is fitted in a recess 110a formed in a housing 110. Preferably, the cover 102 and the housing 110, on which the semicircular portion 146 and the shaft portion 147 slide, are made of a material that allows a smooth slide and offers high durability. In this case, the control member 144 may be supported only on the side of the shaft portion 147. Furthermore, a bearing may be provided around the shaft portion 147 so as to make the rotation smooth.

On the side of the shaft portion 147, the detecting section 148 is provided to detect the rotation of the control member 144. The shaft portion 147 is provided with a circular slit plate 149 that has a plurality of slits 149a at regular intervals on the periphery, and that rotates about the shaft portion 147. A photosensor 149b is mounted to the housing 110 corresponding to a part of the periphery of the slit plate 149.

A brake portion 122 of the brake member 103 is placed at a small distance from the spherical surface of the semicircular portion 146. At one end of the brake member 103, a rotation shaft 123 projects to be passed through a shaft hole 124 (similar to FIG. 8) formed in the housing 110. The other end of the brake member 103 is provided with a pressed portion 125. The pressing member 105 can be in contact with the pressed portion 125, in a manner similar to the above. A gear 105g formed in the pressing member 105 is turned by the driving force from the drive section 106, and the pressing portion 128 presses the upper surface of the pressed portion 125. By the above operation, the brake portion 122 of the brake member 103 presses the surface of the semicircular portion 146, whereby the friction force is generated between the brake portion 122 and the semicircular portion 146, and operating load is imposed on the control member 144.

The configuration of the controller of this embodiment is not limited to the above-described one. Various changes are possible in the shapes of the control member 144, the brake member 103, and the housing 110, the mounting position of the detecting section 148, and the like.

In a case in which the above controller 111 is used for a fishing game, the game can be made more realistic, for example, by pressing the semicircular portion 146 by the brake portion 122 to impose operating load on the control member (reel) 144 when a fish is caught. Furthermore, it is possible to control the operating load to be imposed on the control member by changing the driving amount of the drive section 106 in the controller 111.

In the controller 100 or 111 of the present invention, after operating load is placed on the control member 104 or 144, rspectively, it is possible to recover a state, in which operating load is not imposed, by rotating the gear in reverse.

In order to adjust the driving force of the drive section 106, it is preferable that the operating load (braking force) be adjusted by changing the duty ratio. In this case, it is preferable that the duty ratio be controlled by PWM.

Furthermore, the pressed portion 125 of the brake member 103 may be formed of a leaf spring to be pressed by the pressing member 105.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A controller having a movable control member to be manipulated by a hand, and a detecting section for detecting the motion of said control member, said controller comprising a load variable mechanism for changing an operating load on said control member, wherein said load variable mechanism includes a spring member for urging said control member in an urging direction, and a magnetic attracting unit for attracting said control member in a direction opposite to the urging direction, wherein a friction force applied by a sliding surface, on which said control member slides, differs between a first condition when said control member is not attracted by said magnetic attracting unit, and a second condition when said control member is attracted by said magnetic attracting unit.

2. A controller according to claim 1, wherein vibrations are provided to said control member by said load variable mechanism.

3. A controller according to claim 1, wherein an object on a screen is controlled according to data detected by said detecting section.

4. A controller having a movable control member to be manipulated by a hand, and a detecting section for detecting the motion of said control member, said controller comprising a load variable mechanism for changing an operating load on said control member, wherein said control member includes a stick and a spherical portion, and rotation of said spherical portion, which is urged by an urging member and attracted by a magnetic attracting unit, is detected on at least two axes by said detecting section.

5. A controller according to claim 4, wherein vibrations are provided to said control member by said load variable mechanism.

6. A controller according to claim 4, wherein an object on a screen is controlled according to data detected by said detecting section.

7. A controller having a control member, a support section for supporting said control member, and a detecting section for detecting the motion of said control member, said controller comprising:
   a brake member for applying a variable operating load to said control member;
   a driving section including a motor and a gear; and
   a pressing member for transmitting a driving force from said driving section to said brake member,
   wherein the driving force is transmitted from the motor of said driving section to said brake member via said gear and said pressing member to operate said brake member so as to alter a frictional force between said control member and said brake member, said pressing member transmitting said driving force to said brake member in response to a rotation of said gear.

8. A controller according to claim 7, wherein said control member is made of metal, and said brake member is made of resin.

9. A controller according to claim 7, wherein said control member includes a spherical portion to be manipulated by a hand, and a stick portion, and a rotation of said spherical portion is detected by said detecting section on at least two axes.

10. A controller according to claim 7, wherein said brake member can rotate about a first end in a direction so as to press against said control member, and a pressing member is provided to press a second end of said brake member, said pressing member being driven by said gear.

11. A controller having a control member, a support section for supporting said control member, and a detecting section for detecting the motion of said control member, said controller comprising:
   a brake member for changing an operating load on said control member; and
   a driving section including a motor and a gear,
   wherein a driving force of said motor is transmitted to said brake member via said gear to operate said brake member so as to change a frictional force between said control member and said brake member, and
   wherein said control member is made of metal, and said brake member is made of resin.

12. A controller according to claim 11, wherein said control member includes a spherical portion to be manipulated by a hand, and a stick portion, and a rotation of said spherical portion is detected by said detecting section on at least two axes.

13. A controller according to claim 11, wherein said brake member can rotate about a first end in a direction so as to press against said control member, and a pressing member is provided to press a second end of said brake member, said pressing member being driven by said gear.

14. A controller having a control member, a support section for supporting said control member, and a detecting section for detecting the motion of said control member, said controller comprising:
   a brake member for changing an operating load on said control member; and
   a driving section including a motor and a gear,
   wherein a driving force of said motor is transmitted to said brake member via said gear to operate said brake member so as to change a frictional force between said control member and said brake member, and
   wherein said brake member can rotate about a first end in a direction so as to press against said control member, and a pressing member is provided to press a second end of said brake member, said pressing member being driven by said gear.

15. A controller according to claim 14, wherein said control member is made of metal, and said brake member is made of resin.

16. A controller according to claim 14, wherein said control member includes a spherical portion to be manipulated by a hand, and a stick portion, and a rotation of said spherical portion is detected by said detecting section on at least two axes.

* * * * *